United States Patent
Shih

(10) Patent No.: US 7,558,891 B2
(45) Date of Patent: Jul. 7, 2009

(54) APPARATUS AND METHOD FOR INITIALIZING AN ELASTIC BUFFER

(75) Inventor: Chi-Wei Shih, Taipei (TW)

(73) Assignee: Via Technologies, Inc., Taipei (TW)

( * ) Notice: Subject to any disclaimer, the term of this patent is extended or adjusted under 35 U.S.C. 154(b) by 693 days.

(21) Appl. No.: 10/978,606

(22) Filed: Nov. 1, 2004

(65) Prior Publication Data

US 2005/0102450 A1      May 12, 2005

(30) Foreign Application Priority Data

Nov. 6, 2003    (TW)  .............................. 92131149 A

(51) Int. Cl.
  *G06F 3/00*  (2006.01)
  *G06F 5/00*  (2006.01)
(52) U.S. Cl. .......................................... 710/52; 710/56
(58) Field of Classification Search .................. 710/52, 710/56
  See application file for complete search history.

(56) References Cited

U.S. PATENT DOCUMENTS

| | | | |
|---|---|---|---|
| 6,003,099 A * | 12/1999 | Hintukainen | ................. 710/52 |
| 6,233,629 B1 | 5/2001 | Castellano | ................... 710/29 |
| 6,779,141 B1 * | 8/2004 | Pendurkar | ................... 714/719 |
| 6,836,809 B2 * | 12/2004 | Bace | ........................... 710/57 |
| 7,234,007 B2 * | 6/2007 | Castellano et al. | ............ 710/29 |
| 2003/0105985 A1 | 6/2003 | Keller et al. | ................. 713/400 |
| 2003/0120842 A1 * | 6/2003 | Bace | ........................... 710/57 |
| 2005/0058148 A1 * | 3/2005 | Castellano et al. | ........... 370/428 |
| 2006/0031595 A1 * | 2/2006 | Vorbach et al. | ................. 710/8 |
| 2007/0214291 A1 * | 9/2007 | Castellano et al. | ............ 710/29 |

* cited by examiner

*Primary Examiner*—Alford W Kindred
*Assistant Examiner*—David E Martinez
(74) *Attorney, Agent, or Firm*—Thomas, Kayden, Horstemeyer & Risley

(57) ABSTRACT

An apparatus and method for initializing an elastic buffer. The elastic buffer, a FIFO buffer, outputs and writes data according to a reading index and a writing index, respectively. First, a random number is generated. Then, the writing index is determined according to the random number and the reading index. Finally, the elastic buffer is initialized according to the writing index and the reading index.

4 Claims, 5 Drawing Sheets

APPARATUS AND METHOD FOR INITIALIZING AN ELASTIC BUFFER

This application claims the benefit of Taiwan application Serial. No. 92131149, filed Nov. 6, 2003, the subject matter of which is incorporated herein by reference.

BACKGROUND OF THE INVENTION

1. Field of the Invention

The invention relates in general to an apparatus and method for initializing a buffer, and more particularly to a stochastic initialization apparatus and method for an elastic buffer.

2. Description of the Related Art

In an electrical device, many units have to transmit data. FIG. 1 is a block diagram showing an electrical device. The electrical device 100 includes a first unit 110, a second unit 130, and a buffer 120. The first unit 110 is for outputting data to the second unit 130 averagely at the same speed as the second unit 130 for receiving the data over a long period of time. But, over a short period of time, the speed that the first unit 110 outputs and the speed that the second unit 130 inputs is different. Thus, the buffer 120 is needed for temporary data storage.

The buffer 120 may be caused the buffer underrun error and buffer overrun error. The buffer underrun error means that the buffer region of the buffer 120 is empty, and no data can be read. If the reading speed is higher than the writing speed, the buffer underrun error may occur. The buffer overrun error means that the buffer region of the buffer 120 is full and no data can be further written. If the writing speed is higher than the reading speed, the buffer overrun error may occur.

FIG. 2 is a schematic illustration showing the buffer 120. The buffer 120 is a FIFO (First In First Out) buffer having storage zones that may be regarded as being disposed in a ring. In this example, the buffer has 11 storage zones receptively represented by 0 to 10. The buffer 120 uses the writing index W to indicate the position of the buffer 120 into which the first unit 110 writes, and the reading index R to indicate the position of the buffer 120 from which the second unit 130 reads. In FIG. 2, the reading index R directs to the storage zone 1, which means that the reading process starts at the storage zone 1, and the reserved reading zones are the storage zones 1 to 7. The writing index W is at the position of the storage zone 8, and the reserved writing zones thereof are the storage zones 8 to 10, which means that the writing process starts at the storage zone 8. The written data is filled into the corresponding storage zone according to the position of the writing index W. After a storage zone has been written, the writing index W advances a step clockwise. In the reading process, the data in the corresponding storage zone is read according to the position of the reading index R. Then, the reading index R advances a step clockwise. If the reading speed is too high such that the reading index R catches up with the writing index W, it means that the data stored in the buffer 120 is not enough for reading, and the buffer underrun error occurs in the buffer 120. If the writing speed is too high such that the writing index W catches up with the reading index R, it means that the buffer 120 has no space for writing, and the buffer overrun error occurs in the buffer 120.

In order to avoid the previous error of the buffer 120, the buffer 120 has to be initialized before data transmission. That is, when the buffer 120 is empty, the number of the reserved writing zones and the number of the reserved reading zones are determined in advance. In general, the numbers of the reserved writing zones and the reserved reading zones are set to be the same such that the buffer underrun or overrun error seldom occurs. However, if the number of the storage zones is an odd number, the initialization cannot just make the numbers of the reserved writing zones and the reserved reading zones the same such that the elastic buffer 120 tends to be caused the buffer underrun or overrun error.

FIG. 3A is a schematic illustration showing the buffer 120 that tends to cause the buffer underrun error. During the initialization, six storage zones after the writing index W are reserved for writing. That is, the number of the reserved writing zones is 6. In addition, five storage zones after the reading index are reserved for reading. That is, the number of the reserved reading zones is 5. The number of the reserved writing zones is larger than that of the reserved reading zones, so the buffer 120 in this case tends to be caused the buffer underrun error.

FIG. 3B is a schematic illustration showing the buffer that tends to cause the buffer overrun error. During the initialization, the number of the reserved writing zones is 5, and the number of the reserved reading zones is 6. The number of the reserved writing zones is smaller than that of the reserved reading zones, so the buffer in this case tends to cause the buffer overrun error.

Because the reading speed and the writing speed are not fixed and cannot be predicted, it is important subject to initialize the buffer in order to avoid the problem of buffer underrun or overrun error.

SUMMARY OF THE INVENTION

Embodiments of the invention provide apparatus(s) and methods) for randomly initializing a buffer, i.e., to provide an elastic buffer and an operation method therefore.

One embodiment of the invention provides a method for initializing an elastic buffer, which is a FIFO buffer for outputting and writing data according to a reading index and a writing index, respectively. First, a random number is generated. Next, the writing index is determined according to the random number and the reading index. Finally, the elastic buffer is initialized according to the writing index and the reading index.

Another embodiment of the invention provides an apparatus for initializing an elastic buffer, which is a FIFO buffer for outputting and writing data according to a reading index and a writing index, respectively. The apparatus includes a random number generator for outputting a random number, a reading index accumulator for generating a reading index, a combiner for receiving the random number and the reading index and thus outputting a combined value, and a writing index generator for generating the writing index. The writing index generator comprises a writing indicator accumulator for outputting a writing indicator, a multiplexer for receiving the combined value and the writing indicator and outputting the writing index. When the elastic buffer is initialized, the multiplexer can select either the combined value or the writing indicator as the writing index.

Other contents, features, and advantages of the invention will become apparent from the following detailed description of the preferred but non-limiting embodiments. The following description is made with reference to the accompanying drawings.

DETAILED DESCRIPTION OF THE INVENTION

The buffer underrun and buffer overrun errors may occur in the elastic buffer. As described above, the buffer underrun error means that the buffer is empty, and no data can be read. If the reading speed is higher than the writing speed, the buffer underrun error may occur. The buffer overrun error means that the buffer is full, and no data can be written again. If the writing speed is higher than the reading speed, the buffer overrun error may occur.

During the initialization, the addresses of the writing index and the reading index of the elastic buffer strongly relate to whether or not the storage zone error occurs. So, the invention effectively prevents the storage zone error from occurring by initializing the elastic buffer flexibly. Because the writing speed and the reading speed are not fixed, the invention makes a special effort to prevent the storage zone error from occurring by utilizing the random initialization.

Figure 4:
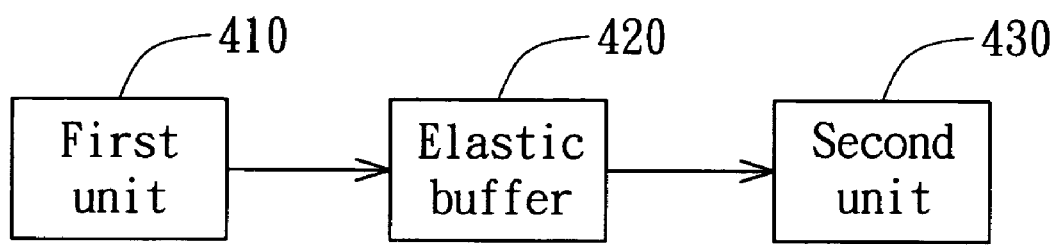
FIG. 4 is a block diagram showing an electrical device according to a preferred embodiment of the invention.

FIG. 4 is a block diagram showing an electrical device according to a preferred embodiment of the invention. The electrical device 400 comprises a first unit 410, a second unit 430, and an elastic buffer 420. The first unit 410 is for outputting data to the second unit 430 at the same speed as that of the second unit 430 for receiving the data over a long period of time but a speed different from that of the second unit 430 for receiving the data over a short period of time. Thus, the buffer 420 is needed for temporary data storage.

Figure 5:
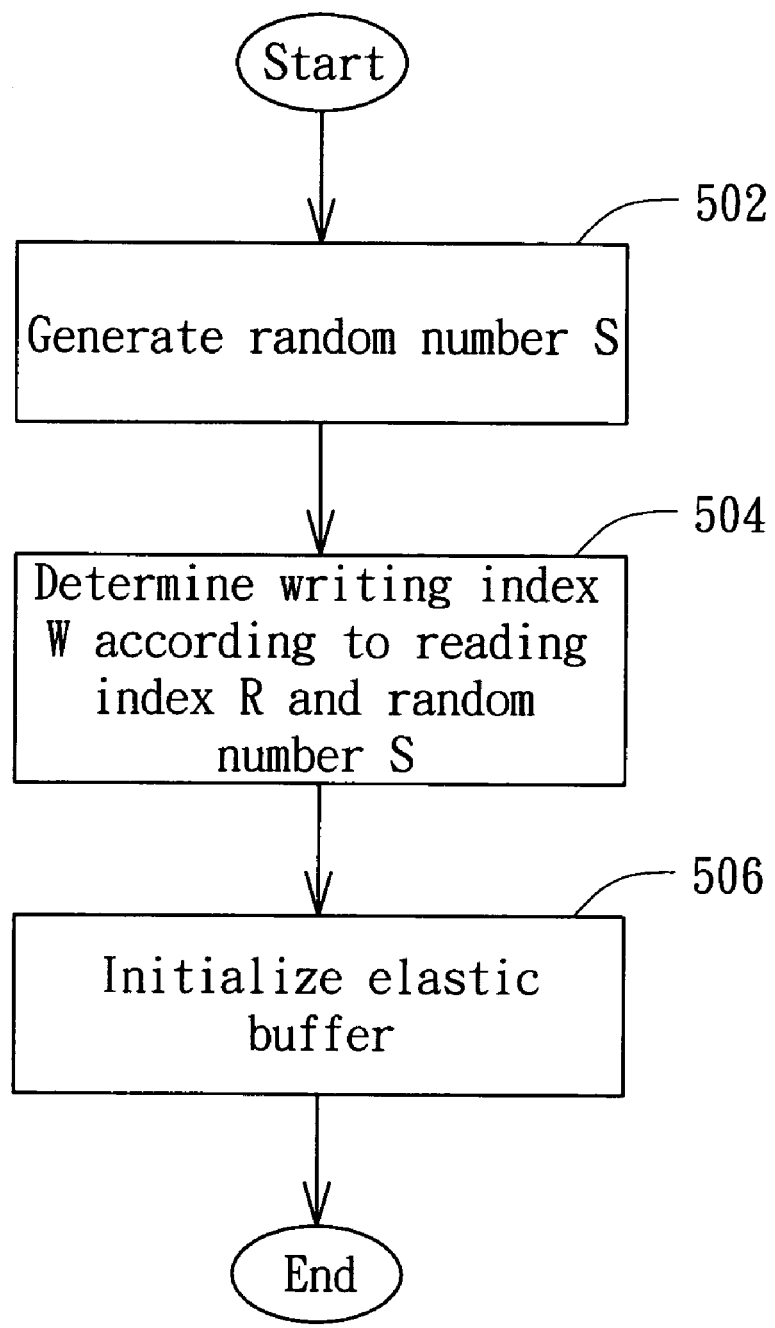
FIG. 5 is a flow chart showing the method for initializing the elastic buffer.

FIG. 5 is a flow chart showing the method for initializing the elastic buffer 420. First, a random number S is generated, as shown in step 502. Then, the writing index W is determined according to the reading index R and the random number, as shown in step 504. Finally, the elastic buffer 420 is initialized according to the reading index R and the writing index W, as shown in step 506.

Figure 1:
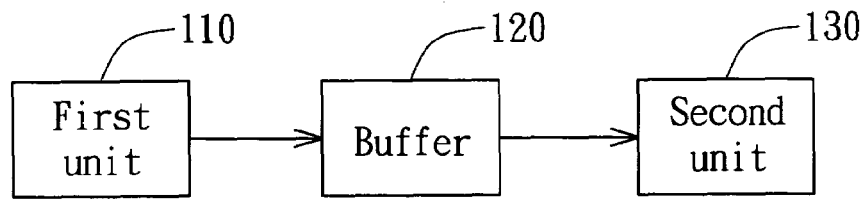
FIG. 1 is a block diagram showing an electrical device.
Figure 2:
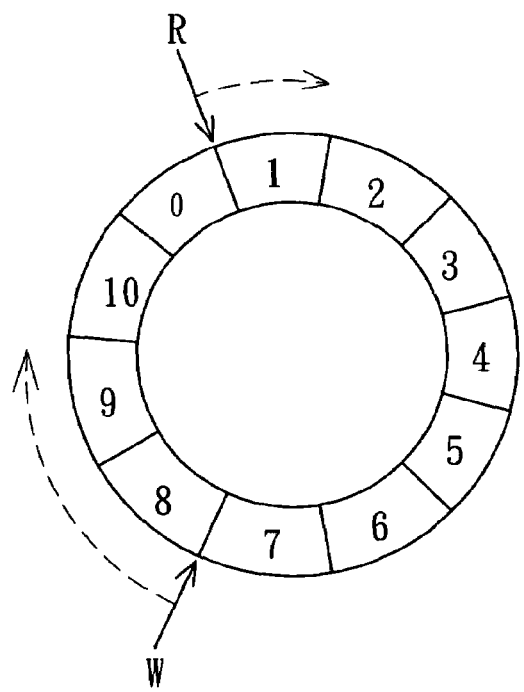
FIG. 2 is a schematic illustration showing a conventional elastic buffer.
Figure 3A:
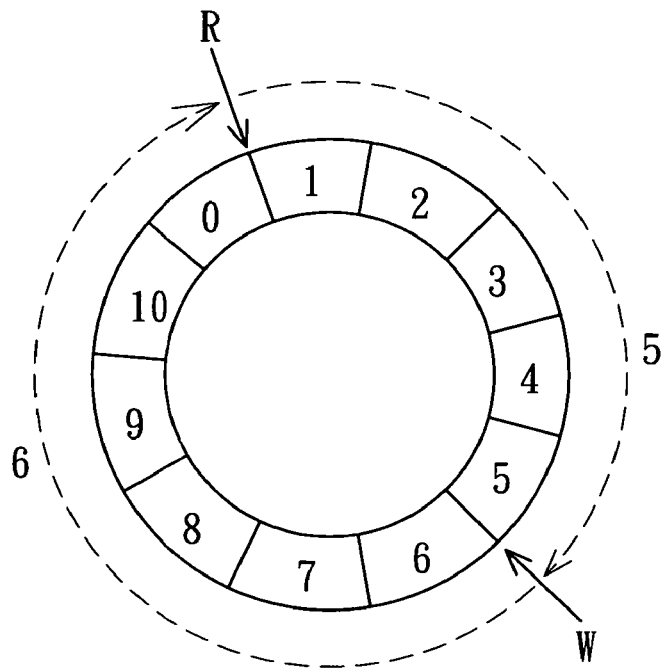
FIG. 3A is a schematic illustration showing a conventional buffer that tends to be caused the buffer underrun error.
Figure 3B:
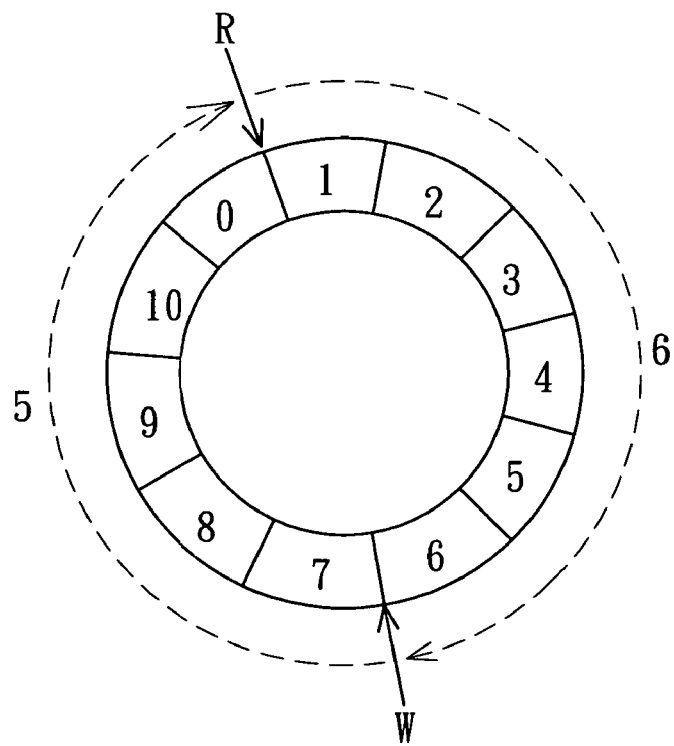
FIG. 3B is a schematic illustration showing a conventional buffer that tends to be caused the buffer overrun error.

Because the elastic buffer 420 is written and read at speeds that are not fixed, the random number S is generated in step 502 of the invention to randomly determine the writing index W and thus to determine the numbers of reserved writing zones and reserved reading zones, respectively, when the elastic buffer 420 is initialized. In the prior art method, the numbers of reserved writing zones and reserved reading zones are fixed during the initialization, as shown in one of the conditions of FIGS. 3A and 3B. If the number of the reserved reading zones is smaller than that of the reserved writing zones, as shown in FIG. 3A, and the reading speed is also higher during the initialization, the buffer underrun error often tends to occur. If the number of the reserved writing zones is smaller than that of the reserved reading zones, as shown in FIG. 3B, and the writing speed is also higher during the initialization, the buffer overrun error often tends to occur. The invention randomly determines the position of the writing index W, as shown in FIG. 3A or 3B, so it is possible to prevent the same storage zone error from occurring repeatedly and thus to reduce the occurrence chance of storage zone error.

Figure 6:
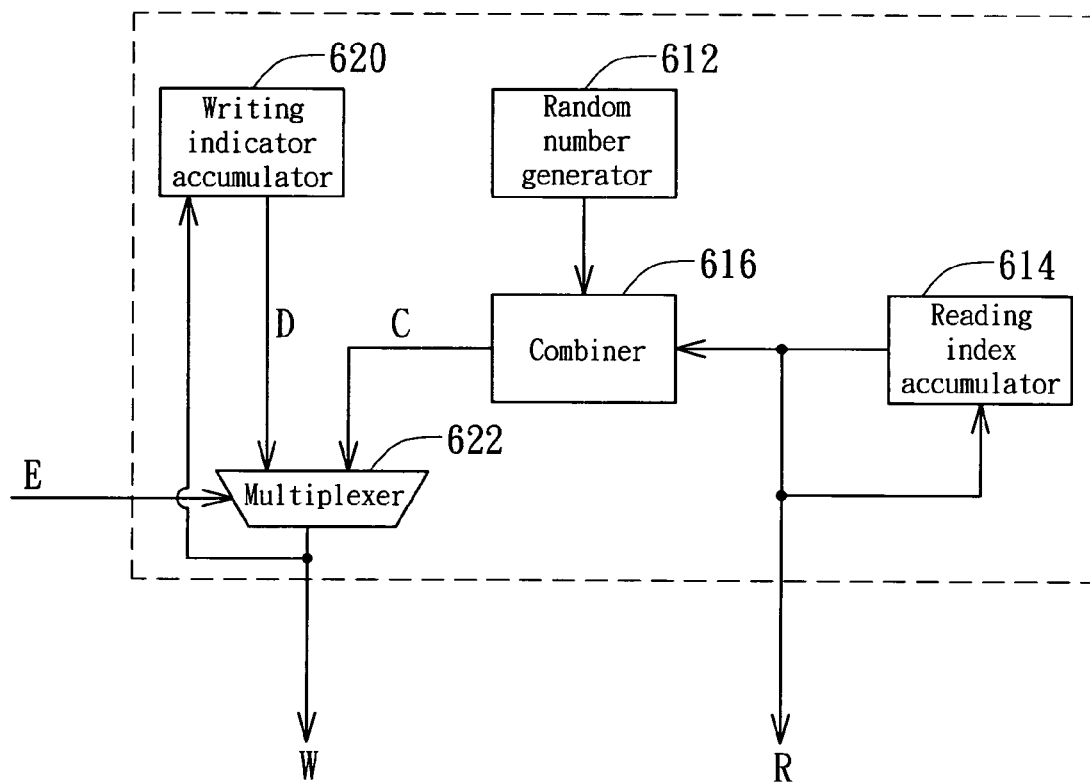
FIG. 6 is a schematic illustration showing an apparatus for initializing the elastic buffer.

FIG. 6 is a schematic illustration showing an initialization apparatus 422 for initializing the elastic buffer 420. The initialization apparatus 422 comprises a random number generator 612, a reading index accumulator 614, a combiner 616, and a writing index generator. The writing index generator includes a writing indicator accumulator 620 and a multiplexer 622. The random number generator 612 is for outputting the random number S. The reading index accumulator 614 is for generating the reading index R, which is also transmitted to the reading index accumulator 614. The combiner 616 outputs the combined value C according to the reading index R and the random number S. The writing indicator accumulator 620 is for outputting the writing indicator D. The multiplexer 622 receives the combined value C and the writing indicator D and outputs the writing index W. When the elastic buffer 420 is initialized, the multiplexer 622 selects the combined value C as the value of the writing index W. When the data of the elastic buffer 420 is normally accessed, the multiplexer 622 selects the writing indicator D as the writing index W, which is also transmitted to the writing indicator accumulator 620. When the elastic buffer 420 is empty, an initial signal E is outputted to the multiplexer 622, and the multiplexer 622 further decides to select the combined value C or the writing indicator D according to the initial signal E. The elastic buffer is initialized according to the reading index R and the writing index W, and then the numbers of the reserved writing zones and the reserved reading zones determined.

When the number of storage zones of the elastic buffer is not large, the buffer overrun or underrun error tends to occur easily. Using the invention may effectively reduce the occurrence chance of storage zone error. At this time, the generated random number S may be 1 or 0 such that the difference between the numbers of the reserved writing zones and the reserved reading zones during the initialization may fluctuate between −1 and 1. Of course, the random number S may be other integers. As the number of the storage zones gets larger, the integral value that may appear in the random number S could also gets larger. In particular, when the number of storage zones of the elastic buffer is an odd number, the number of reserved writing zones cannot be equal to that of the reserved reading zones. This invention is more suitable for this case so as to change the numbers of the reserved writing zones and the reserved reading zones randomly during the initialization. For example, when the total number of the reserved zones of the elastic buffer is (2n+1), wherein n is a positive integer, and the number of the reserved writing zones may be set to be n or (n+1) according to the random number S.

The apparatus and method for initializing the elastic buffer according to the embodiment of the invention randomly determine the numbers of the reserved writing zones and reserved reading zones of the elastic buffer during the initialization. Thus, the occurrence chance of the storage zone error may be minimized when the elastic buffer works in different reading and writing speeds.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for randomly initializing an elastic buffer, which is a FIFO buffer for writing data received from a first unit and outputting data to a second unit according to a writing index and a reading index, respectively, the method comprising the steps of:

generating a random number, which is an integer;

setting a value for the reading index;

determining a value of the writing index based on the reading index value and the random number, wherein the writing index value is equal to a combination of the reading index value and the random number, the generating, setting, and determining steps are performed each time the elastic buffer is initialized, and initialization is triggered in case that both of the first unit and the second unit are ready to send and receive data, respectively; and initializing the elastic buffer according to the respective values of the writing index and the reading index.

2. The method according to claim 1, wherein the elastic buffer comprises (2n+1) storage zones, and n is a positive integer.

3. The method according to claim 2, wherein a difference between the writing index and the reading index is n storage zones.

4. The method according to claim 2, wherein a difference between the writing index and the reading index is (n+S) storage zones, and S is an integer.

* * * * *